INSTRUCTION EXECUTION MARKER FOR TESTING COMPUTER PROGRAMS

Filed April 8, 1965

INVENTORS
CLARENCE T. APPLE
JAMES T. DERVAN

BY Robert W. Berray

ATTORNEY

United States Patent Office 3,427,443
Patented Feb. 11, 1969

3,427,443

INSTRUCTION EXECUTION MARKER FOR TESTING COMPUTER PROGRAMS

Clarence T. Apple, Poughkeepsie, and James T. Dervan, Pleasant Valley, N.Y., assignors to International Business Machines Corporation, Armonk, N.Y., a corporation of New York Filed Apr. 8, 1965, Ser. No. 446,638
U.S. Cl. 235—153 7 Claims
Int. Cl. G08b *29/00;* G08c *25/00;* G06f *11/00*

ABSTRACT OF THE DISCLOSURE

A main store mapping device is disclosed wherein a computing system is placed in a testing mode to permit the use of a parity bit location in each main store word to be utilized as a marker. During the test mode, parity checking is eliminated and a marker signal is generated each time an instruction is fetched from main store. When the instruction is regenerated in the main store location, the marker signal is inserted in the parity bit position so that after the program under test has been run, an examination of the presence or absence of the marker signal in the parity bit position provides an indication of those instructions of the program which were utilized.

This invention relates to a testing device and, more particularly to a means by which the effectiveness of a test problem on a computer program can be measured.

When a new digital computer is developed or an existing computer is requested to perform a particular job, an orderly set of instructions is coded in a particular sequence to form a program. The execution of the program is accomplished by causing the computer to manipulate data in accordance with each coded instruction of the program. Each instruction is manifested by a plurality of digits, most usually binary 1 or 0 values. The digit combinations are examined by the computer to control various manipulations on other instructions or data words also manifested by a plurality of digits. The orderly sequence of instructions of the program are placed in a storage device along with data to be operated upon. The storage device will usually be a core storage device, a disk, or drum unit having a plurality of locations which can be designated or addressed such that data or instructions can be read from, or inserted into, the storage device at the addressed location.

During the process of executing a particular program, an instruction counter will normally be utilized for addressing the storage device whenever a particular instruction is required in the performance of the program. When the instruction is obtained from the storage device and transferred to the computer, it will control the manipulation of data within the computer or may call for the addressing of a particular location in the storage device to obtain data for manipulation. After each instruction has been executed by the computer, a next succeeding instruction will be called for from the storage device. The next instruction may be from a next sequential storage location designated by the counter or, dependent upon machine conditions, may be taken from a location in the storage device not necessarily in a sequential location. The writing of a sequence of instructions to make up a program to solve a particular problem normally starts with a programmer who anticipates the type of information to be used in the problem and difficulties or data dependent conditions which may require a change in the instruction sequence to perform the entire problem.

With the advent of computer system programs, numerous problems have developed in providing an efficient, error-free product to the computer customer on schedule. In the past, the program has tended to grow in a haphazard manner and be released to the customer when it was thought to be complete. Now, as the program has become a significant part of the total computer product, significant to the point that a computer system will not be shipped to a customer if the program is not ready, the situation has changed. In developing a program as a product, many separate groups must act upon the program as it passes through various stages of completion. As a result of this interaction, a standard has been needed around which procedures could be established to permit an orderly growth of a program. These procedures are used to control the appropriate times at which the program would flow from one group to the next. This standard for a program is the testing stage ("de-bugging" level). After a particular section of a computer program is coded and tested to a specific level by one group, it is passed to another group which combines it with other sections and conducts further tests. When this larger group is tested to a given level, it is combined with other major groupings, and so on. Eventually the program sections are all combined and are subjected to an extensive "system" test. When the group conducting this test observes the test level to have reached some pre-established value, the programming system is released to a special group which represents customer usage. This group now tests it until another pre-established level is reached at which point it is released to customers.

The testing of various sections of a program is required to insure that when a section of a program has been written or coded with an orderly sequence of instructions, that data dependent changes in the instruction sequence will accomplish a particular job. A test of a program is designed to exercise the instructions of the program for solving a particular problem. It has been found, however, that tests conducted with a program do not always exercise each and every instruction of the program, such that certain data dependent conditions which might exist with a customer usage may produce conditions which were not anticipated and cannot be handled by the instruction sequence provided by the program.

Many useful purposes will be served by specifying a minimum testing level which can be manifested to programmers during the coding stage and the people testing a particular program. An internal check can be provided at each stage of a computer program coding insuring that the program is ready to progress to the next stage. In this way effort will not be wasted, for example, in trying to system test a program for which all the components are not ready for such a test. Although all problems may not be found before release, a minimum standard of testing can be set which will insure a satisfied first user. The high cost of maintaining a poorly tested program can be drastically reduced. The large numbers of programmers and clerical personnel as well as the large amounts of machine time can be sharply reduced by setting such a standard and in this way insuring that less than a certain number of problems will be discovered by the customer and in turn fixed by the maintenance crew.

Justification for the use of a minimum test level requires a means for creating the ability to measure or monitor the effectiveness of a test on a program. The total problem of providing a complete and exhaustive test for each computer program has not yet been solved but the present invention has been shown to be useful in determining a lower limit on the test level of a program. This consists of determining the specific instructions of a program under test which have been executed as the result of processing a given test case. These are then related to the total number of instructions in the program. This is called the tested level.

An object of this invention is to provide means easily adapted to mark the usage of stored information in a computer during predetermined processing cycles and conditions.

Another object of this invention is to provide a means by which the effectiveness of a test on a computer program can be measured.

It is also an object of this invention to provide an easily implemented means for designating the use of each instruction utilized in a program during a testing procedure.

Another object of this invention is to provide a computer program testing monitor system whereby the execution of each instruction of the program during a test operation can be signified by inserting a marker digit in each instruction.

A further object of this invention is to provide a means by which the effectiveness of a test on a computer program can be measured by inserting a marker in a digit position of an instruction, the digit position being one used for other purposes during the normal instruction handling of the computer but which does not affect the total processing capability of the program under test.

These and other objects, features and advantages are obtained in a preferred embodiment of this invention which shows the modifications required in a data processing system for providing a means of marking instructions of a stored program which are actually executed during the process of testing the program. Included in the system is a storage device, most usually a three-dimensional core storage, which has a plurality of addressable locations. At each addressable location in the storage device is a plural digit word. Each word in the storage device will be ether data or instructions usually coded with binary 1's and 0's. A portion of the storage device is set aside for the insertion of a plurality of instructions in sequential locations utilized in the performance of a program. In at least another small portion of the storage device will be contained a program utilized for initiating a test of the program of interest. In the remaining portion of the storage device will be data utilized in the program under test.

Most computers, when executing a program, may proceed through several distinct cycles during an operation with a particular instruction of the program. One cycle is usually identified as an I-cycle or instruction fetching cycle. During the I-cycle, an instruction counter which is updated each time an instruction is executed is utilized for addressing a particular location in the storage device in order to obtain the next instruction for execution. During this I-cycle, the instruction counter contents, or possibly some data dependent address, will be transferred to the storage device addressing means in order to read out the next instruction for transfer to the central processing unit. When the instruction is obtained in the central processing unit and decoded, the next following computer cycles are usually identified as execution cycles during which internal computations and data fetches/stores are accomplished under controls contained in the stored instruction.

In the preferred embodiment of the invention, the means by which the effectiveness of a computer program testing operation is measured is caused to generate a marker signal during each instruction fetching or I-cycle of a central processing unit operation. The marker signal which is generated during each I-cycle is utilized for inserting a predetermined binary value in a predetermined digit location of the addressed location of the instruction to be executed. It can easily be seen that any other uniquely determined condition, as for example one particular type of execution cycle, could similarly be used to insert a marker bit in a significant digit location. At the completion of the portion of the program under test, the sequential address locations of the storage device which contain the program under test can be read out from the storage device to the central processing unit and an examination made of the predetermined digit position to determine whether or not a particular instruction in the program was actually executed. Therefore, if the binary value of the digit position for each instruction of a program is recorded and compared with anticipated results, a count and identification can be made of all storage locations from which instructions have been executed. After a number of test cases have been applied to the program under test, the total number of instructions exercised by each test case can be determined and a correlation made between all the test cases to determine the total number of instructions exercised. This value can be compared with a minimum standard necessary to insure that a particular program sequence has been tested to an extent indicating probable reliable results when utilized by a customer.

If a low number of instructions in relation to the total program volume have been executed by a particular test case, a different and more extensive test case can be presented to the program for insuring that more and more instructions are in fact exercised during the testing to insure that they will operate satisfactorily when utilized by the customer.

The foregoing and other objects, features and advantages of the invention will be apparent from the following more particular description of a preferred embodiment of the invention, as illustrated in the accompanying drawings.

Figures 1, 2:
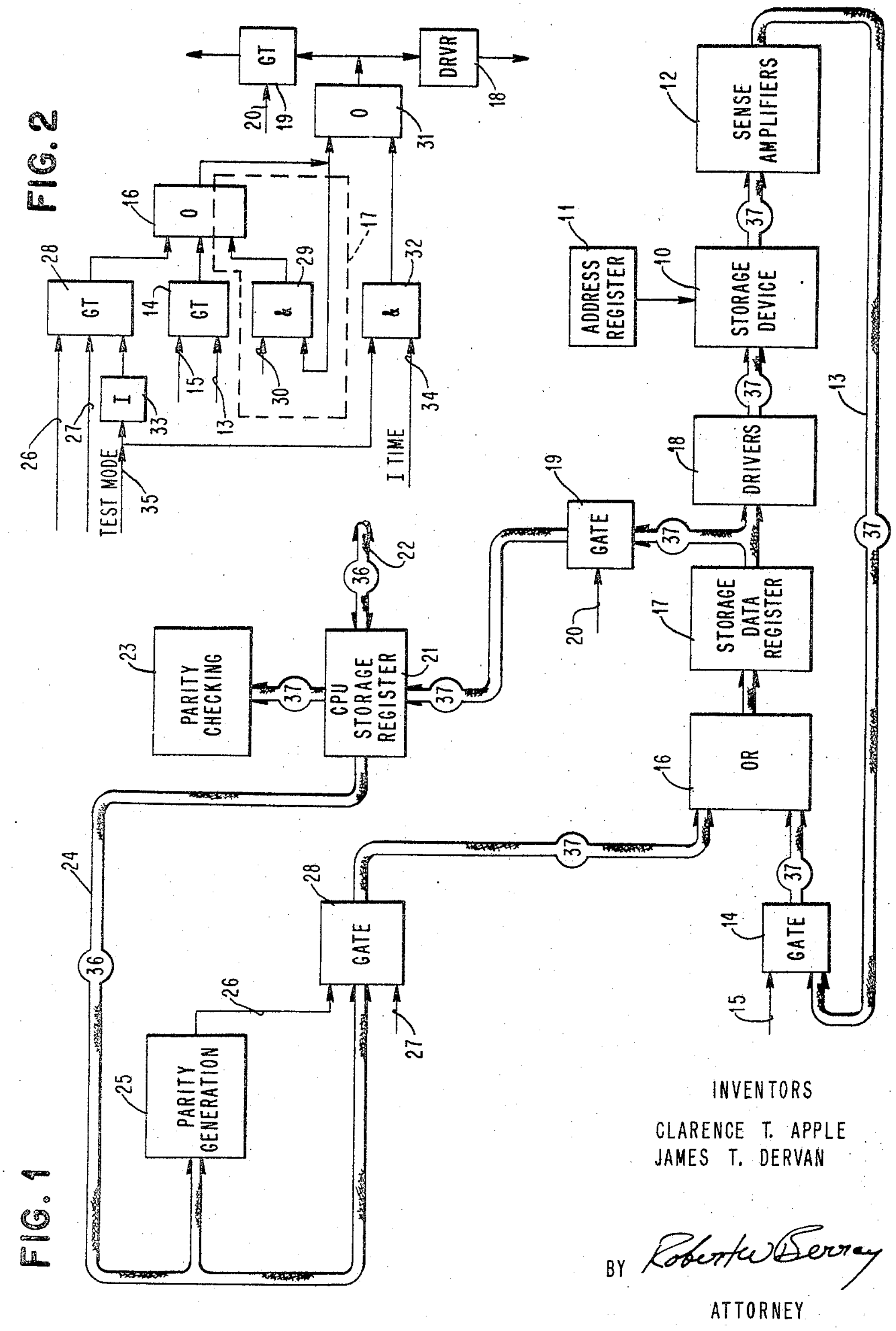
FIGURE 1 is a schematic representation of circuits usually found in a destructive read-out storage device of a computer system.
FIGURE 2 is a schematic representation of the logic required for reading out or storing binary information in one bit position of an addressed location of a storage device including the modifications required to a desired bit position for practicing the invention.

In the preferred embodiment of the invention, a storage device is provided which has a plurality of locations each of which can be addressed to store information therein or read information therefrom. Each storage location consists of a plurality of digit positions, each position capable of registering a binary 1 or binary 0 value. In one preferred embodiment, each storage location or computer word has 36 binary bit positions plus a 37th position. The 37th position may be an extra position provided for the purposes of the present invention, or may be utilized as a parity bit position during the normal operation of the computer. The 37th bit position or parity bit, is a binary 1 or binary 0 dependent upon the odd or even number of binary 1 bits in the remaining 36 positions of the stored information. To be more fully explained later, the parity bit position of each storage location will be utilized in a special test mode of operation for inserting a marker bit whenever a reference is made to the storage device for the purpose of transferring an instruction of a program to the central processing unit for subsequent execution. The addressing and reading out of an instruction word from the storage device is distinguished from all other references to the storage device by the status of a trigger within the central processing unit which designates instruction fetching operations. A marker signal generated each time an instruction fetching cycle is initiated will be utilized for inserting a binary 1 value in the 37th bit position of all instructions fetched during the test of the program.

Although the following description refers to marking all instructions or memory locations fetched from storage during instruction fetching cycles, the same logic can be utilized for marking storage locations fetched during any processing cycle or condition. For example, the marker signal can be generated when the system is executing an input/output instruction and a storage fetch is made to obtain one of a plurality of stored control words. At the completion of the test, the control words used at least once can be noted.

FIGURE 1 depicts schematically the interconnections of major components of a storage device utilized in a data processing system. The preferred embodiment of this invention has been implemented with a storage device which is a three-dimensional core storage. A detailed description of the timing, interconnection, and control of a core storage device with a central processing unit can be found in U.S. Patent No. 3,058,659, issued Oct. 16, 1962, assigned to the assignee of this invention. A core storage device operates in a two-cycle read-write fashion. Whether information is to be read out and transferred to the central processing unit, or is to be stored from the central processing unit, the first half of a complete cycle will be a readout of binary information at a location addressed by an address register. Following the readout at the addressed location, there will be a cycle in which information is written into the addressed location. If the reference to the storage device is for the purpose of reading out information to a central processing unit, the information read out will be regenerated in the same addressed location for retention in the storage device. If the reference to storage is to store new information at a particular addressed location, the information read out of the addressed location will not be regenerated during the write cycle, but rather, the new information will be inserted at the addressed storage location. The core storage device will be utilized for the purpose of storing instructions of the program which it is desired to test and provide a marker indication for all those instructions actually executed. Another portion of the storage device will be utilized for the storing of data and answers to data manipulations accomplished by the program, and yet other portions of the core storage device will be utilized for a series of program instructions which will control the testing of the program under consideration.

In the discussion that follows, binary 1 and binary 0 information should be considered as being the presence or absence respectively of pulses or in the case of a steady state voltage level, a positive voltage as distinguished from a negative voltage. A computer word is shown as 36 binary digit positions all being registered or transferred simultaneously. (Numerals 36 or 37 associated with cabling indicate the number of digits transferred). A 37th position, when referred to, should be considered a parity bit position or, in accordance with the present invention, a specially provided digit position for the purpose of registering a marker bit during the testing of a computer program.

A general discussion of how information is stored in a storage device or read out from a storage device to the central processing unit will be shown in connection with FIGURE 1. The storage device 10 can be considered a randomly addressable storage device which, in the preferred embodiment, may be a three-dimensional core storage array having the capability of storing 37 binary bits in any one location. There can be provided any number of accessible locations each of which will be accessible by providing a plural binary bit address in an address register 11. Whether information is to be stored in an address location or read from an address location, the sequence is always the destructive reading out of the addressed location followed by a writing of information. During the read-out portion of each storage reference, sense amplifiers 12 will be utilized to amplify and transfer the presence or absence of a switching current from the 37 cores of the addressed location. The information will be transferred on a cable 13 to a gating device 14. There will be 37 identical gates in the gating device 14. Since read-out of information at the addressed location is destructive, retention of the information requires regeneration. If the reference to storage is to transfer data or instructions to the central processing unit, a gating line 15 will be energized to pass the information through 37 identical OR circuits 16 to a storage data register 17. A "gate" or "AND" logical circuit requires all inputs to be positive to produce a positive output. An OR circuit will produce a positive output when any input is positive. When the information read from the storage device 10 is to be transferred to a central processing unit and retained at the address location in the storage device 10, drivers 18 are energized by the contents of the storage data register 17 to reinsert, or regenerate, the information read from the storage location. At the same time, the contents of the storage data register 17 will be gated by a series of gates 19, suitably enabled by an input 20, to a CPU storage register 21 in the central processing unit. The information to be utilized by the central processing unit will be gated out of the CPU storage register on suitable cabling 22 to the proper registers within the central processing unit.

In one preferred embodiment of the invention, a 37th bit position is normally provided for the storage of a parity bit. When information is read from the storage device 10 for utilization in the central processing unit, the information read into the CPU storage register 21 is checked for proper parity prior to the time it is transferred on to various registers within the cental processing unit. The parity checking is accomplished in a parity checking circuit 23 which generates the parity of the 36 information bits and compares this with the parity bit in the 37th position to provide an error or no-error indication.

When new information is to be stored in a particular location of the storage device 10, the address of the location which is to receive the information will be inserted in the address register 11. The information will be received in the CPU storage register 21 on cabling 22, Suitable cabling 24 will be utilized to feed the 36 data bits into a parity generation circuit 25 for generating a parity bit to be included as a 37th bit position with the 36 data bits. When the reference to storage is for storing information, a line 27 will enable a series of 37 gates 28. For each storage reference, either line 27 or line 15 to gates 14 will be positive. The 36 data bits on cable 24 and the generated parity bit on line 26 are transferred through the gating system 28 to a second input of the OR circuits 16 to the storage data register 17. The contents of the storage data register 17 will then be utilized by the core drivers 18 to insert the 36 data bits and parity bit in the location addressed by the address register 11.

FIGURE 2 shows the necessary logic required to implement the present invention, namely, the means by which a predetermined bit position of all storage locations can be initially set to a binary 0 value and thereafter set to a binary 1 value only when the storage location is read out for the purpose of fetching an instruction of a program under test. As suggested previously, the predetermined bit position to be utilized as a marker can be especially provided in a system utilized for testing programs or, as in one preferred embodiment, can be a special machine condition set by an operator or program which will inhibit the normal operation of the parity bit generation and utilize the parity bit position of all storage locations for marking those locations utilized during an instruction fetching operation.

FIGURE 2 represents one bit position of certain components referred to in connection with FIGURE 1 and have been correspondingly numbered. The one position represented is the gating arrangement of the 37th or parity bit position. The following blocks and lines of FIGURE 1 are also shown in FIGURE 2: gate 14, line 15, cable 13, gate 28, line 27, line 26, OR circuit 16, gate 19, line 20, driver 18, and storage data register 17. (Storage data register 17 is actually made up of the output of OR 16 which is fed back to an AND circuit 29. When the output of OR 16 is to be latched or stored, line 30 will be positive. If OR 16 produces a positive output having received a positive input, AND 29 will provide a positive input to OR 16 until line 30 is made negative.)

When the parity bit position is used as the marker position an OR circuit 31 and AND circuit 32 are added to the normal logic. A switch on the operator console or a particular instruction contained in a supervisory program contained in the storage device will be utilized to cause a line 35 to go positive indicating that the data processing machine is now being placed in a special machine state labeled "Test Mode." When line 35 goes positive AND 32 is enabled and gate 28 disabled through inverter 33. When the system is running normally, or not in Test Mode, inverter 33 produces a positive output and gate 28 is enabled to transfer the parity bit generated on line 26. If it is assumed that the data and program, which is desired to test, are not in the storage device, and that the Test Mode switch has been set to the special state, each instruction of the program to be tested and the data will be stored in the storage device 10 with the 37th digit position containing binary 0's. Gate 28 will not be capable of producing any binary 1 parity bits as it has been disabled from functioning by the inverter 33 in response to a positive signal, Test Mode, on line 35. If the program to be tested is already in the storage device 10, a small program can be provided for reading out each instruction to CPU storage register 21, followed by a storing of the instruction through gate 28. Gate 28 of the parity position will be disabled such that the instruction will be restored with a binary 0.

As mentioned previously, each major cycle of a data processing system includes an I-fetch cycle in which the next instruction to be executed by the central processing unit must be read out of the storage device and transferred to the central processing unit for subsequent execution during an execution portion of the major cycle. The data processing system disclosed in the above-mentioned patent has a trigger or bistable device which produces a signal whenever the central processing unit is in the process of doing an instruction fetch. This signal is provided on a line 34 labeled I-Time. Line 34 will be positive whenever an instruction fetching cycle is taking place within the central processing unit. With the Test Mode signal 35 positive and the I-Time line 34 positive, AND circuit 32 will produce a binary 1 or positive output. The output of AND circuit 32 which is a marker signal, produced during each instruction fetching cycle, is transmitted through OR circuit 31 to the drivers 18 of FIGURE 1. Therefore, during each I-Time of Test Mode operation, the 37th digit position of an addressed instruction will have inserted therein a binary 1 value.

After the program under test has been subjected to the entire test, only those storage locations which have actually been utilized during an instruction fetching cycle will have a binary 1 value in the 37th bit position. All other references to storage locations will result in a binary 0 being placed in the 37th digit position. Gate circuit 14 would function normally to properly reinsert a binary 0 in the 37th bit position of all storage locations read out during instruction executing cycles as opposed to instruction fetching cycles.

The AND circuit 32 is shown producing a marker signal in response to Test Mode on line 35 and I-Time on line 34. The positive signal on line 34 can be produced in response to any logical combination of cycles or conditions in the CPU. The signal on line 34 could be, for example, a logical combination of having decoded an input/output instruction in the CPU requiring the fetching of a control word. The provision of additional circuits like FIGURE 2 could produce several markers, each designating particular CPU cycles or conditions. Each marker would be inserted in a designated position of storage locations fetched during the cycle or condition.

After the program has been subjected to a test, it is then possible to utilize a small supervisory program to sequentially read out all storage locations which contained the program under test. The locations would be read out sequentially from the storage device 10 and gated to the CPU storage register 21 of FIGURE 1. The parity position, or other designated position, can be examined for a binary 1 or binary 0 condition and the state of the position can be recorded on an output device. After the bit position has been examined in the CPU storage register 21 of FIGURE 1, an instruction can be issued to store the instruction back in the same addressed location. When the instruction is restored into the storage device 10, gate circuit 28 will still be suppressed, such that the 37th bit position, if it was a binary 1 from the previous test execution, will be reinserted as a binary 0 value such that the instruction can then be subjected to a new series of tests.

There has thus been shown, a means by which either special structure may be added in the form of an extra bit position or wherein an already existing bit position, normally utilized to insert a data dependent parity bit, can be modified to enable the bit position to be utilized as a marker for indicating that a particular storage location was read out and transferred to a central processing unit for the purpose of utilizing the contents of the storage location as an instruction. In this way, the predetermined bit position utilized as a marker can be examined and recorded to provide a means for identifying each instruction of a program under test that is actually executed. Further, the invention provides a means for indicating the total number of program instructions executed at least once during a test as compared with the total number of stored instructions in the program. If a minimum number of instructions must be executed at least once during the test of a stored program before the program is sent to another design group or ultimately to a customer, the present invention provides an easily implemented means by which the effectiveness of program testing can be measured.

While the invention has been particularly shown and described with reference to a preferred embodiment thereof, it will be understood by those skilled in the art that various changes in form and details may be made therein without departing from the spirit and scope of the invention.

We claim:

1. In a data processing system having a randomly addressable storage device wherein references to addressed locations of the storage device are for the purpose of storing information or fetching information, including the fetching of instructions to be subsequently utilized for manipulating data in the performance of a stored program, comprising in combination:

- transfer means for providing a signal indicating one of a plurality of types of information fetching cycles;
- means responsive to said transfer means for generating a marker signal;
- and means connected to said marker signal generator for transferring said marker signal to a predetermined digit position of the addressed location of the information fetched.

2. In a data processing system having a randomly addressable storage device wherein references to addressed locations of the storage device are for the purpose of storing information or fetching information, including the fetching of instructions to be subsequently utilized for manipulating data in the performance of a stored program, comprising in combination:

- transfer means for providing a signal indicating an instruction fetching cycle;
- means responsive to said transfer means for generating a marker signal;
- and means connected to said marker signal generator for transferring said marker signal to a predetermined digit position of the addressed location of an instruction fetched.

3. In a data processing system having a randomly addressable storage device wherein references to addressed locations of the storage device are for the purpose of storing information or fetching information, including the fetching of instructions to be subsequently utilized for manipulating data in the performance of a stored program, comprising in combination:

means for setting a predetermined digit position of each storage location of a stored program to a predetermined first binary value;

a transfer means for providing a signal indicating one of a plurality of types of information fetching cycles;

means responsive to said transfer means for generating a marker signal;

and means connecting said marker signal generator to said predetermined digit position of said storage locations for setting said predetermined digit position of addressed locations of instructions fetched to a predetermined second binary value.

4. In a data processing system having a randomly addressable storage device wherein references to addressed locations of the storage device are for the purpose of storing information or fetching information, including the fetching of instructions to be subsequently utilized for manipulating data in the performance of a stored program, comprising in combination:

means for setting a predetermined digit position of each storage location of a stored program to a predetermined first binary value;

transfer means for providing a signal indicating an instruction fetching cycle;

means responsive to said transfer means for generating a marker signal;

and means connecting said marker signal generator to said predetermined digit position of said storage locations for setting said predetermined digit position of addressed locations of instructions fetched to a predetermined second binary value.

5. In a data processing system having a randomly addressable storage device wherein references to addressed locations of the storage device are for the purpose of storing information or fetching information, including the fetching of instructions to be subsequently utilized for manipulating data in the performance of a stored program, comprising in combination:

means operative during data processing system instruction fetching cycles for generating a cycle identifying signal;

means for signalling a special data processing system test state;

means connected to said cycle identifying signal generator and said test state signalling means for generating a marker signal during said special test state and each instruction fetching cycle;

and means connecting said marker signal generator to a predetermined digit position of each storage location for inserting said marker signal in said digit position of each location of an instruction fetched by the data processing system.

6. In a data processing system having a randomly addressable storage device wherein reference to addressed locations of the storage device are for the purpose of storing information or fetching information, including the fetching of instructions to be subsequently utilized for manipulating data in the performance of a stored program, comprising in combination:

means for signalling a special data processing system test state;

means connected to said test state signalling means operative when the data processing system is in said test state and information is being stored in the storage device for setting a predetermined digit position of each storage location receiving information to a predetermined binary value;

means operative during data processing system instruction fetching cycles for generating a cycle identifying signal;

means connected to said cycle identifying signal generator and said test state signalling means for generating a marker signal during said special test state and each instruction fetching cycle;

and means connecting said marker signal generator to said predetermined digit position of each storage location for setting the binary value of said digit position of each location of an instruction fetched by the data processing system to a predetermined second value.

7. In a data processing system having a randomly addressable storage device wherein reference to addressed plural digit locations of the storage device are for the purpose of storing information or fetching information, including the fetching of instructions to be subsequently utilized for manipulating data in the performance of a stored program, comprising in combination:

means for signalling a special data processing system test state;

means normally operative during the storing of information in each location of the storage device for inserting, in a predetermined digit position, a check digit having a binary value dependent on the binary value of the remaining digit positions;

means connected to said test state signalling means operative when the data processing system is in said test state and information is stored in the storage device for disabling said check digit inserting means whereby said predetermined digit position of each storage location receiving information is set to a predetermined binary value;

means operative during data processing system instruction fetching cycles for generating a cycle identifying signal;

means connected to said cycle identifying signal generator and said test state signalling means for generating a marker signal during said special test state and each instruction fetching cycle;

and means connecting said marker signal generator to said predetermined digit position of each storage location for storing a predetermined binary value in said digit position of each location of an instruction fetched during the execution of the program by the data processing system.

References Cited

UNITED STATES PATENTS 3,222,653 12/1965 Rice -------------- 340—172.5

OTHER REFERENCES

Reference Manual, IBM 1401 Data Processing System, p. 15, under heading "Word Marks."

MALCOLM A. MORRISON, *Primary Examiner.*

C. E. ATKINSON, *Assistant Examiner.*

U.S. Cl. X.R.

340—146.1, 172.5